July 24, 1928.

M. E. GREENHOUSE

SHOCK ABSORBER FOR VEHICLES

Filed April 2, 1927

1,678,040

Inventor
Martin E. Greenhouse,
By J. Stuart Freeman,
Attorney

Patented July 24, 1928.

1,678,040

UNITED STATES PATENT OFFICE.

MARTIN E. GREENHOUSE, OF PHILADELPHIA, PENNSYLVANIA.

SHOCK ABSORBER FOR VEHICLES.

Application filed April 2, 1927. Serial No. 180,360.

The object of the invention is to provide improvements in shock absorbers and yielding take-up means generally, but more particularly as related to the various demands of automobiles. However, as here used, the words "vehicle" and "automobile" are to be understood as relating broadly to any mechanism wherein the principles of construction hereinafter described can be efficiently employed.

Thus, there is provided not only a resilient connection between a vehicle body and its chassis, to minimize the conduction of vibrations set up in the latter to the former and its occupants, but likewise an elastic connection for various other devices such for instance as an elevator and its suspension cables or supporting plunger.

The application of the improved principles of construction to a vehicle will adequately illustrate the invention, and so the accompanying drawings and following description will discuss the invention in terms of its application to a vehicle, the object in such case being basicly to minimize the rebound after striking an unevenness in the road surface, or an object superimposed upon the latter, to cause both sides of a vehicle to proportionately share the jar of encountering such irregularities, and to provide compensation for the variations in resiliency of the usual supporting springs of a vehicle.

Further objects more specifically are to provide a substantially diamond shaped shock absorber, the side elements of which are flexible, and as the opposed horizontal angles of which are pressed apart, the vertical angles of which are drawn towards each other, to partially counterbalance the tendency of the supporting spring of the vehicle (to which the device is attached) to separate the vertical angles upon the rebound following a sudden jolt.

Figure 1:
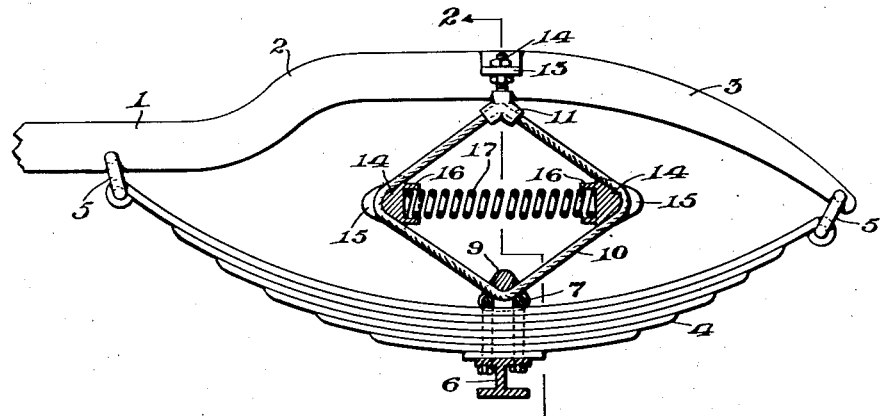
Figure 2:
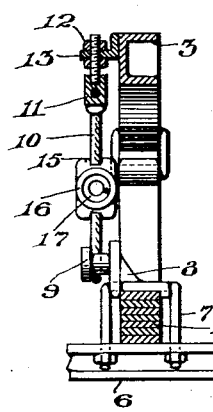
Figure 3:
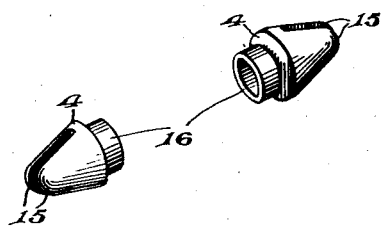
Figure 4:
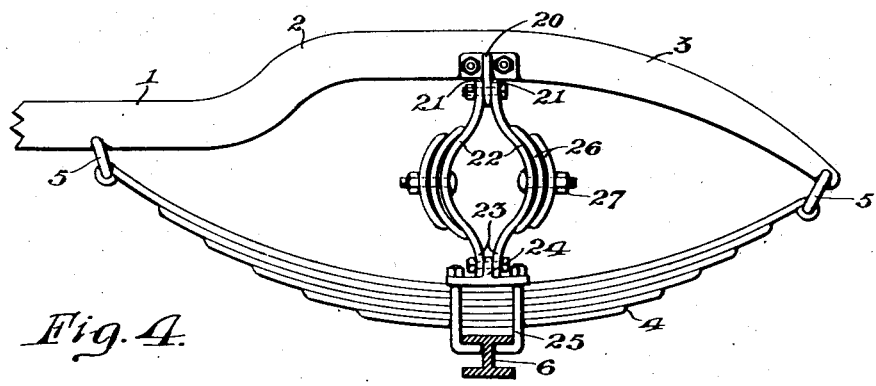

With these and other objects in mind, the present invention comprises further details of construction and operation, which are fully brought out in the following description when read in conjunction with the accompanying drawings, in which Fig. 1 is a side elevation of one end portion of a vehicle frame in combination with a semi-elliptical spring, supporting a transversely extending axle in spaced relation with said frame and showing in partial cross-section one embodiment of the invention extending between said frame and said spring; Fig. 2 is a vertical section on the line 2—2 of Fig. 1; Fig. 3 is a perspective view of the two oppositely positioned members connecting the respective opposite ends of the flexible element shown in Fig. 1, with an interposed expansion spring and Fig. 4 is a modified form of the invention illustrated by an elevation somewhat similar to that of Fig. 1.

Referring to Figs. 1, 2 and 3, a portion 1 of a vehicle frame is shown as comprising an upwardly extending portion 2 and a freely projecting downwardly curved portion 3, while a semi-elliptical leaf spring 4 is connected by means of shackles 5 to the frame 1 and projecting portion 3. To the central region of said spring is secured a transversely extending axle or strut 6, upon the ends of which latter are rotatably carried one of the usual pairs of wheels (not shown).

Said strut may be secured to the leaf spring in any suitable manner, but is here shown as being attached thereto by means of any well-known type of U-bolts 7, which also serve to secure to the upper portion of said spring a bracket 8, provided with a laterally extending stud 9, around which passes any desired type of flexible element 10, such as a steel cable, band, or the like. Said flexible element is preferably in the general form of a diamond, the lowermost angle of which is defined by the stud 9, while the uppermost angle is defined by a suitable Y-support 11, which is adjustably secured by any suitable means 12, to a bracket 13, connected rigidly with the inwardly extending portion 3 of the vehicle frame.

Intermediate of said upper and lower angles, the horizontally extending angular portions of the element 10 are curved about the body portions 14 of members which are provided with parallel outwardly extending flanges 15, between which said flexible member is positioned, and with rearwardly or inwardly extending hollow cylindrical projections 16. A preferably helical compression spring 17 extends between the members 14 and has its ends seated within the cylindrical cup-like receptacles 16.

In the operation of this embodiment of the invention, the usual pressure of the vehicle frame downwardly against the relative upward pressure upon the spring 4 permits the spring 17 to force the members 14 apart and thus horizontally elongate the diamond shape of the flexible member 10. Conversely, after a wheel of the vehicle has struck an obstruction or the like, thereby causing the supporting spring 4 to rise and straighten out, the tendency of said last-named spring to rebound with the result that a distinct heavy jar is imparted to the frame 1 and the body of the vehicle carried thereby as well as the occupants or contents of the latter. It is at the instance of this tendency of the supporting spring 4 to rebound that the shock absorber performs its function, the spring 17 always tending to elongate the diamond shape of the flexible element 10 retards the vertical elongation of said element and thereby prevents the undesirable sudden rebound of said supporting spring.

Referring to Fig. 4, a similar frame and supporting spring structure is shown as that hereinbefore described. However, the frame member is provided with a bracket 20, to a downwardly extending free end of which are secured the adjacent upper portions 21 of a pair of oppositely positioned semi-elliptic spring elements 22, the opposite ends 23 of which latter extend downwardly and are secured in turn to a bracket 24, secured by U-bolts 25, or otherwise, to the transversely extending shaft or strut 6. While the central portions of the spring elements 22 are substantially semi-elliptic in shape, they are relatively flat as compared with separate curved spring leaves 26, secured to the outer surfaces of the said curved portions of said springs by means of bolts 27 or the like which are adjustable so as to place a variable tension upon said springs 22.

Thus, with the structure illustrated in Fig. 4, a rebound of the supporting spring 4 with respect to the frame 1 causes the shock absorbing spring elements 22 to bend outwardly against their natural tendency and thus retard the otherwise sudden shock upon the vehicle and its contents due to said rebound. It will be noted that in order to insure the elements 22 accomplishing their desired function, they must individually and collectively exert a longitudinal or vertical tension, that is, their natural tendency must be to flatten themselves as far as permitted by the frame and supporting spring between which they extend and to which they are attached. However, in order to vary the tension upon said elements, the adjusting means 27 may be altered so as to more or less close the leaves 26 upon and in conformity with the curvature of the central portion of the elements 22, or vice versa, to increase the curvature of the latter in conformity with the curvature of the combined auxiliary leaves.

Having thus described my invention, what I claim and desire to protect by Letters Patent of the United States is:—

1. The combination of a vehicle, an axle and a spring operatively connecting and tending to separate said vehicle and axle, with a shock absorber in turn comprising a pair of flexible elements connected at one end to the vehicle and at their other ends to the axle, and a resilient member extending between said elements intermediate of their ends, mounting blocks engaging said elements intermediate their ends on which said spring is solely supported, said spring serving to hold the blocks in engagement with the elements and operative to separate their intermediate portions, thus drawing their respective opposite ends together and partially counterbalancing the tension of said member.

2. The combination of a vehicle, an axle and a spring operatively connecting and tending to separate said vehicle and axle, with a shock absorber in turn comprising a pair of flexible elements connected at one end to the vehicle and at their other ends to the axle, a pair of blocks having spaced projections, each element adjacent said blocks being imperforate and for its full width extending over one of said blocks between its projections, a resilient compression spring extending between said blocks, and means to prevent the accidental lateral displacement of said member with respect to said blocks, said member being operative to separate the central portions of said elements, whereby their respective opposite ends are drawn towards each other and the tension of said member partly counterbalanced.

3. The combination of a vehicle frame, an axle, and a spring operatively connecting and tending to separate said frame and axle, with a shock absorber in turn comprising a pair of flexible elements together forming a substantially diamond shaped figure, the upper most angle of which is connected to said frame, and the lowermost angle of which is connected to move with said axle, a compression spring operative to force apart the laterally oppositely extending intermediate portions of said figure, said blocks engaging said elements, said blocks mounting the spring and the spring in turn securing the blocks in place whereby the upper and lowermost portions of the figure are drawn towards each other, to partially counter-balance the tension of said spring.

4. The combination of a vehicle frame, an axle, and a spring operatively connecting and tending to separate said frame and axle, with a shock absorber in turn comprising a pair of flexible elements together forming a substantially diamond shaped figure, the uppermost angle of which is connected to said frame, and the lowermost angle of which is connected to move with said axle, a compression spring operatively connected to and operative to force apart the laterally oppositely extending intermediate portions said figure, a block between each end of said last-named spring and said elements, means to receive the elements bodily and prevent the accidental lateral displacement of each block with respect to the adjacent portion of the neighboring element, and means to prevent the accidental lateral displacement of said blocks with respect to said compression spring, said spring being positioned solely by the blocks and in turn solely holding the blocks in place, said shock absorber being operative to draw towards each other said frame and axle against the tension of said first spring.

5. In combination, a flexible shock-absorbing element, a pair of blocks, each block at one end having means to engage and bodily receive the element, an expansive means, and receptacle means at the other ends of the blocks positioning said expansive means operatively with respect to the element.

6. In combination, a flexible shock-absorbing element, a pair of blocks, said blocks having bifurcations of substantially the width of the element to receive the element, an expansive means, and said blocks having flanges positioning said expansive means operatively with respect to the element.

7. In combination, a loop-like flexible shock-absorbing element, an expansive means spanning the element, and devices at one end mounting the expansive means, and at the other ends having slots bodily receiving the element.

In testimony whereof I have affixed my signature.

MARTIN E. GREENHOUSE.